No. 778,332. PATENTED DEC. 27, 1904.
T. REDMAN.
VALVE FOR CONTROLLING THE FLOW OF GAS THROUGH PURIFIERS, &c.
APPLICATION FILED MAR. 19, 1904.

2 SHEETS—SHEET 1.

ATTEST.

INVENTOR.
THOMAS REDMAN.
BY Dyer Spear Company
ATTY'S

No. 778,332. PATENTED DEC. 27, 1904.
T. REDMAN.
VALVE FOR CONTROLLING THE FLOW OF GAS THROUGH PURIFIERS, &c.
APPLICATION FILED MAR. 19, 1904.

2 SHEETS—SHEET 2.

ATTEST.

INVENTOR.
THOMAS REDMAN.
BY Ellis Spear & Company
ATTYS.

No. 778,332. Patented December 27, 1904.

UNITED STATES PATENT OFFICE.

THOMAS REDMAN, OF BRADFORD, ENGLAND.

VALVE FOR CONTROLLING THE FLOW OF GAS THROUGH PURIFIERS, &c.

SPECIFICATION forming part of Letters Patent No. 778,332, dated December 27, 1904.

Application filed March 19, 1904. Serial No. 198,991.

*To all whom it may concern:*

Be it known that I, THOMAS REDMAN, a subject of the King of Great Britain and Ireland, and a resident of The Priory, Bolton, Bradford, in the county of York, England, have invented certain Improvements in Valves Applicable for Controlling the Flow of Gas Through Purifiers and other Vessels, (for which I have made application for a patent in Great Britain, No. 4,533, dated February 24, 1904,) of which the following is a specification.

This invention relates to certain improvements in the construction of valves in connection with the purification of gases; and the object is to arrange and combine the parts of said valves in such a manner that the current of gas flowing through the main supply-pipe to the purifiers or the like may be made to flow through the apparatus in either direction, and thus by being able to reverse the flow of the gas-current to more effectually utilize the purifying agency deposited in the box; also, to arrange the valves so that the flow of gas may be entirely cut off from the purifying-box and continued direct through the main pipe, thus forming a by-pass in the valve or when necessary to close and stop the flow through the main supply-pipe leading to a range of purifiers or the like.

In describing my improved valve in detail reference is made to the accompanying drawings, in which—

Figure 1:
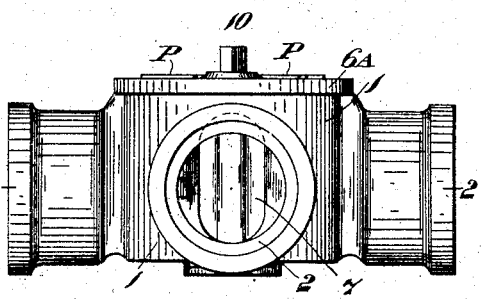
Figure 3:
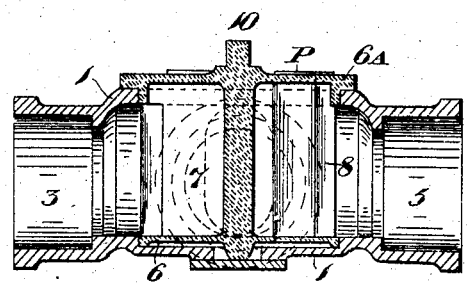
Figure 2:
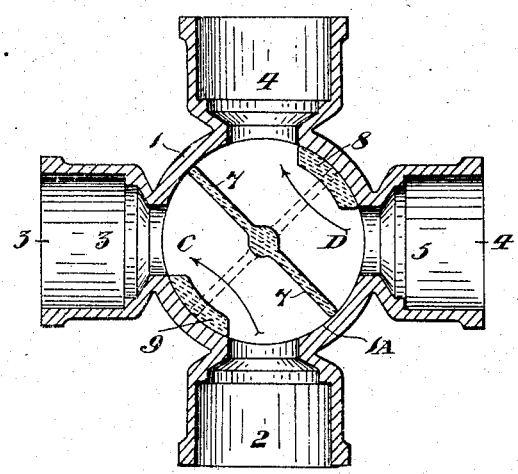
Figure 4:
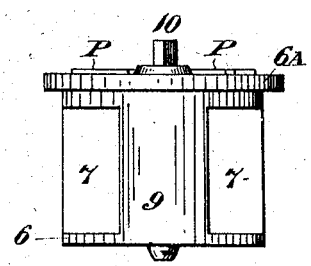
Figure 5:
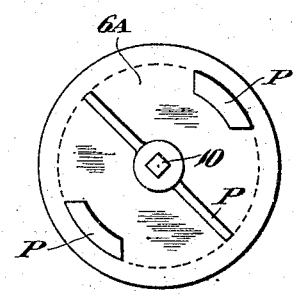
Figure 6:
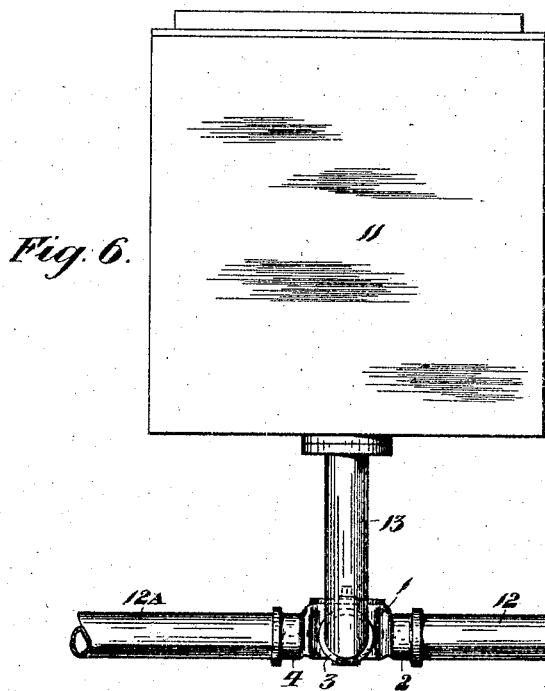

Figure 1 represents an elevation of a valve-casing suitable for carrying out my improved construction. Fig. 2 is a sectional plan through line 1 2; Fig. 3, a sectional elevation through line 3 4; Fig. 4, an elevation of the valve shell or plug; Fig. 5, a plan of the top disk plate covering the center compartment of valve-casing; Fig. 6, an end view of a purifying-box with valve and connecting-pipes coupled to same drawn to a reduced scale, and Fig. 7 is a plan of same drawn at right angles to the view shown by Fig. 6.

The valve-casing 1 is provided with branches 2, 3, 4, and 5, adapted for pipe connections, and the interior circumference of casing at $1^A$ is truly bored either parallel or conical for the reception of the operative shell portion of the valve, which is somewhat in the form of a plug, provided with a circular-bottom disk plate 6 and a cover disk plate $6^A$, made to fit the internal circumference of valve-casing, the said disks being connected by a central shaft and mid-feather 7 and by two cover-plates 8 and 9, also turned to fit the internal circumference $1^A$ of casing. A projection 10 at top affords means for rotating and placing the plug within the valve-casing in the position required. The raised portions P on the upper surface of disk plate $6^A$, corresponding in position to the mid-feather and shutters, indicate the position of the latter within the casing in relation to the branches.

Figure 7:
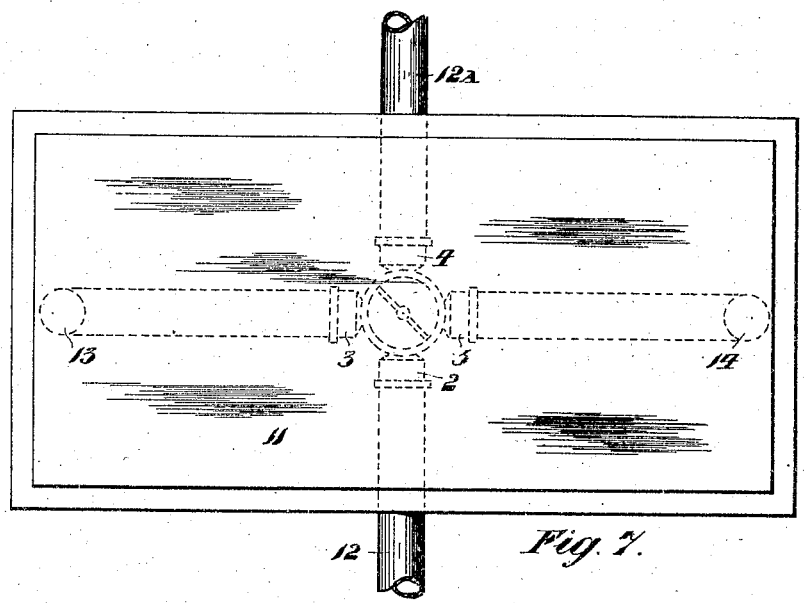

On utilizing the valve in connection with gas-purifying boxes 11 one valve is required for each purifying-box of the ordinary internal construction, and in describing the action of the valve I will suppose the branches 2 and 4 are connected to ordinary main gas-pipes 12 and $12^A$, conveying gas from the retorts to the gas-holder or the like, and the branches 3 and 5 connected to the inlet 13 and outlet-pipes 14, respectively, of a gas-purifying box 11, as shown by Figs. 6 and 7.

The branch 3 is shown connected by pipe 13 to the usual inlet and branch 5 by pipe 14 to the usual outlet of a purifying-box 11, in which case the gas flowing through branch 2 passes in the direction of curved arrow C to branch 3 and through connecting-pipe to purifying-box 11, thence permeating upward through the purifying agency to the top of box, the gas escaping through pipe 14 to outlet branch 5, into and through the valve-casing in the direction of arrow D, and to branch 4, connected to a continuation of main pipe $12^A$ on the opposite side of valve.

It is well known to gas-workers that the lower portion of the purifying agency within an ordinary purifying-box, such as 11, is liable to become clogged to some extent with heavy impurities, thereby reducing the freedom of the passage of gas through the purifying agency, while the upper portion of said agency is far from being exhausted.

In order to more fully utilize the purifying agency, and thereby keep a box 11 at work for a longer period without having to empty and recharge same, I accomplish this by turning the plug within casing 1 a distance of ninety degrees from the position shown, bringing the mid-feather 7 shown by full lines to that shown by dotted lines in Fig. 2. Thus by these means the direction of the gas-flow from the main 12 through purifying-box 11 is reversed and delivered to the upper surface of the purifying agency within the box. The crude gas descending permeates through the purifying agency in a downward direction, thereby more effectually using and exhausting the efficiency of said agency and to that extent prolonging the time required between one changing and another of the purifying agency within the box.

When it is necessary for the inlet and outlet branches 3 and 5, leading to the purifying-box 11, to be closed, the rotary valve-plug is moved forty-five degrees from the position shown, so that the cover-plates 8 and 9 are opposite said branch openings, the mid-feather 7 in that case being in line with the branch openings 2 and 4, leaving a direct thoroughfare through the gas-main pipe 12 and valve, and by moving the said plug so that the cover-plates 8 and 9 close the openings through branches 2 and 4 it will be obvious that the gas-main 12 is then closed. It will also be obvious that valves made in the manner as shown and described are equally applicable to reverse the direction of the current supplied to same, whether gas or liquid.

What I claim as my invention is—

1. A four-way valve-casing provided with ports, a rotating shell-plug in said casing having a top and bottom circular disk connected by a mid-feather 7 of a cross-sectional width less than the diameter of the ports extending across the disks and with cover-plates 8 and 9 combined and adapted for directing the current flowing through the valve in the manner substantially as shown and described.

2. A valve-casing having ports therein and combined with a rotary shell divided at or near the center by a mid-feather of a cross-sectional width less than the diameter of the ports and at the circumference by cover-plates for the purpose and substantially in the manner as shown and described.

3. A valve comprising a casing having a plurality of ports, a mid-feather of less width in cross-section than the cross-sectional dimension of the ports whereby opposite ports will be left open when the mid-feather is in line therewith, and cover-plates disposed in a plane at right angles to the plane of the mid-feather and adapted to close opposite ports, the said mid-feather with cover-plates being rotatable in unison, whereby a pair of opposite ports may be left open and the other pair closed, or the adjacent ports may be left open in pairs for the passage of the fluid in reverse directions through the valve, substantially as described.

In witness whereof I have hereunto set my hand in the presence of two witnesses.

THOMAS REDMAN.

Witnesses:
W. ILLINGWORTH,
E. HAMMOND.